United States Patent [19]
Tullsson

[11] Patent Number: 6,121,918
[45] Date of Patent: Sep. 19, 2000

[54] PROCEDURE FOR THE ELIMINATION OF INTERFERENCE IN A RADAR UNIT OF THE FMCW TYPE

[75] Inventor: Bert-Eric Tullsson, Järfalla, Sweden

[73] Assignee: CelsiusTech Electronics AB, Järfälla, Sweden

[21] Appl. No.: 09/269,562

[22] PCT Filed: Oct. 16, 1997

[86] PCT No.: PCT/SE97/01734

§ 371 Date: May 12, 1999

§ 102(e) Date: May 12, 1999

[87] PCT Pub. No.: WO98/16848

PCT Pub. Date: Apr. 23, 1998

[30] Foreign Application Priority Data

| Oct. 17, 1996 | [SE] | Sweden | 9603810 |
| Dec. 20, 1996 | [SE] | Sweden | 9604774 |
| Dec. 20, 1996 | [SE] | Sweden | 9604775 |

[51] Int. Cl.[7] .................................................. G01S 13/34
[52] U.S. Cl. ........................... 342/159; 342/128; 342/196
[58] Field of Search .................................. 342/159, 162, 342/128, 129, 135, 196

[56] References Cited

U.S. PATENT DOCUMENTS

| Re. 36,095 | 2/1999 | Urabe et al. | 342/133 |
| 4,528,565 | 7/1985 | Hauptmann | 343/17.1 |
| 4,692,766 | 9/1987 | Rolfs | 342/200 |
| 5,563,602 | 10/1996 | Stove | 342/70 |
| 5,973,636 | 10/1999 | Okubo et al. | 342/70 |

FOREIGN PATENT DOCUMENTS

| 408248124 | 9/1996 | Japan | G01S 13/34 |
| WO009816846A | 4/1998 | Sweden | G01S 13/34 |

OTHER PUBLICATIONS

Skolnik, Introduction to Radar Systems, 2nd Ed., McGraw–Hill 1980, Chapter 3.
Haykin, Adapted Filter Theory, 2nd Ed., Prentice Hall 1991, Chapters 9 and 13.
"FM–CW radar applied to the detection of buried objects in snowpack", Yamaguchi, Y.; Sengoku, M.; Abe, T.; Boerner, W.M., Antennas and Propagation Society International Symposium, 1990. AP–S. Merging Technologies for the 90's. Digest., 1990, p. 738.
"FMCW range resolution for MMW seeker applications", Piper, S.O., Southeastcon '90. Proceedings., IEEE, 1990, pp. 156–160 vol. 1.
"Velocity–aided range acquisition and tracking in dual–mode CW/FM–CW radar", Saunders, W.K., Radar and Signal Processing [see also IEE Proceedings–Radar, Sonar and Navigation], IEE Proceedings F vol.: 136 Aug. 4, 1989, pp. 191–192.
"A three–frequency scatterometer technique for the measurement of ocean wave spectra", Schuler, D.L.; Keller, W.C.; Plant, W.J., Oceanic Engineering, IEEE Journal of vol.: 16 Jul. 3, 1991, pp. 244–253.
"Tracking targets with unknown process noise variance using adaptive Kalman filtering", Gutman, P.–O.; Velger, M., Decision and Control, 1988., Proceedings of the 27th IEEE Conference on, 1988, pp. 869–874 vol. 1.

Primary Examiner—John B. Sotomayor
Attorney, Agent, or Firm—Pollock, Vande Sande & Amernick

[57] ABSTRACT

A procedure for the elimination of interferences of short duration, such as pulses, in a radar unit of the FMCW type where the transmitted and received signals are combined to form a useable signal is provided. According to the procedure, interferences in the useable signal are detected and eliminated in the time domain and the part of the useable signal with interference is reconstructed by extrapolation based on samples without interference. Thus, the occurrence of interferences is prevented in the complex Fourier Transform of the type that is generated by known methods of clipping the signal.

8 Claims, 5 Drawing Sheets

PROCEDURE FOR THE ELIMINATION OF INTERFERENCE IN A RADAR UNIT OF THE FMCW TYPE

FIELD OF THE INVENTION

This invention concerns a procedure for the elimination of interferences of short duration, such as pulses, in a radar unit of the FMCW type with linear frequency sweep, where the transmitted and received signals are combined to form a useable signal in the form of a difference signal, the beat signal, with a wave for each target, where the frequency, amplitude and phase of the wave contain the information about the target and the beat signal is sampled. The procedure within the field of mobile radars, but can also be used for other FMCW radar applications.

BACKGROUND OF THE INVENTION

The principle for linear FMCW radar is well-known, see for example Skolnik, Introduction to Radar Systems, 2nd Ed., McGraw-Hill 1980, Chapter 3. Technical advances have in recent years resulted in an increased use of FMCW radar units, which will not be considered further here. A linear FMCW (Frequency Modulated Continuous Wave) radar unit works in principle as follows:

A frequency sweep controls an oscillator with a variable frequency so that the transmitted frequency varies periodically. Each period has principally three parts, namely a constant base frequency, a linear frequency sweep and a rapid return to base frequency. The linear frequency sweep is the time when the radar unit is "carrying out useful work" and often constitutes 70–80% of the total time (work factor 0.7–0.8).

For the sake of simplicity in the discussion below the radar unit and its target are stationary. In the case of moving targets or moving radar units the Doppler effect also comes into play. For most actual FMCW systems however, the Doppler effect only involves a minor correction to the following.

The propagation time from the radar unit to a target and back again is typically a few microseconds. A signal received from a target has therefore the frequency that was transmitted a certain time before. As the frequency is swept this is not the same frequency that is being transmitted. The received frequency also has a linear frequency sweep. As the received frequency sweep and the transmitted frequency sweep are parallel with a time-displacement equal to the propagation time, as a result for a fixed target the difference in frequency between the transmitted and received signal will be constant. This constant frequency difference is given by the product between the propagation time to the target and the gradient of the frequency sweep expressed as frequency per unit of combining time.

The signal processing in a linear FMCW radar unit consists principally of the transmitted and received signals, so that the difference signal (the beat signal) is generated. This signal is the sum of a number of sine waves, where each sine wave represents a radar target. The sine waves have different frequencies, amplitudes and phase positions in accordance with the principle that large amplitude corresponds to large target, high frequency corresponds to target at a great distance. The Doppler effect (due to the relative speed) mainly affects the phase positions.

In order to determine what targets are being observed and what are their sizes and relative speeds, the difference signal is frequency-analyzed. The frequency analysis is best carried out digitally by passing the difference signal through an anti-alias filter and sampling at a constant sampling rate, after which the sampled signal is multiplied by a window function to reduce the amplitude of the signal at the start and end of the sampling period and is sent to a signal processor that carries out a Discrete Fourier Transform, DFT, usually with a fast algorithm, known as an FFT, Fast Fourier Transform. The Fourier Transform is generally complex but for a real time signal (difference signal) it has a certain degree of symmetry. In order to be able to use FFT algorithms the number of samples is usually selected as a power of two (256, 512, 1024, . . . . ). 256 samples give 256 FFT coefficients, but if the signal is real the symmetry means that of these 256 values only 128 (actually 129) are independent.

By Fourier Transform, for example by FFT, the signal is divided into a number of discrete frequency components, sines. Each frequency corresponds as above to a distance. The amount of a complex FFT coefficient is a measurement of the radar target area (the received power) for the target in the corresponding frequency window (distance window). The FFT performs what is known as a coherent integration of the target signal, which is advantageous. The subsequent signal processing in the system is carried out digitally on the calculated FFT coefficients.

It can be shown that the nominal width of a distance window is inversely proportional to the change in frequency of the linear FMCW sweep during the sampling period. For a distance resolution of 1 m a change in frequency of 150 MHz is required. In order to change the distance resolution, the gradient of the frequency sweep can for example be changed while retaining the same constant sampling time.

The sampling rate limits the frequencies of the beat signal that can be studied and thereby the total observed distance area. The width of this "useable band" that lies parallel to the linear FMCW sweep is often less than 1 MHz.

A linear FMCW radar unit can be subject to interference if it receives signals other than its own transmitted signals reflected from various targets. The radar unit can be subject to interference from other radar units, including pulse radar units, pulse compression radar units and other FMCW radar units. Interferences of short duration arise for instance when the linear sweep in the FMCW radar unit is subject to interference from base frequencies or return frequencies from another FMCW radar unit.

An interference of short duration (a pulse) during the sampling period has a short extent in the time domain and is very broad-band in the frequency domain. A short but strong interference affects only a few samples of the beat signal but can totally mask many frequency windows in the Fourier Transform. The "noise level" in the Fourier Transform can appear to be increased, so that small targets can be masked by the interference.

A known method for suppressing interferences of short duration is to eliminate the interference by inserting a low value, e.g. 0, ("clipping") during the time the interference is detected. Clipping to 0 can in itself eliminate the interference from the time signal but introduces instead interference in the complex FFT, as the useable signal is also affected. Among other things targets with strong contrast are widened (get side beams). The interferences in the FFT can be modified, but never eliminated, by means of various compromises in the implementation of the clipping.

SUMMARY OF THE INVENTION

The purpose of this invention is to achieve elimination of interferences of short duration from the time signal, by a method which does not result in the defects of the known methods described above. The present invention method is based on the useable signal being extrapolated (predicted) over the area with interference. The method is characterized by the interference in the beat signal being detected and eliminated in the time domain and the beat signal being reconstructed during the part with interference by means of extrapolation based on samples without interference.

In accordance with one preferred method, the beat signal is reconstructed for the part with interference by extrapolation in both directions based on both previous and subsequent samples without interference.

In accordance with another suitable method, the beat signal is extrapolated for the part with interference as linear combinations of samples without interference. An FIR filter can thereby be used for the linear combinations of samples without interference. The coefficients of the linear combinations can with advantage be determined by means of adaptive methods.

In accordance with yet another preferred method, information is used from previous FMCW sweeps by extrapolation. This can be carried out as the radar aerial has only turned through a small angle, a fraction of the aerial's beam width, since previous FMCW frequency sweeps. The dominant sine waves in the signals have therefore almost the same frequency and almost the same amplitude. The method increases the reliability of the prediction of the beat signal.

In accordance with another suitable method the beat signal is pre-filtered. The sensitivity in the detection of the interference is thereby increased. Information from previous FMCW sweeps can be used for the pre-filtering.

BRIEF DESCRIPTION OF THE DRAWINGS

The method according to the present invention will be described below in greater detail with reference to the enclosed figures, wherein.

DETAILED DESCRIPTION OF THE PREFERRED EMBODIMENT(S)

Figure 1:
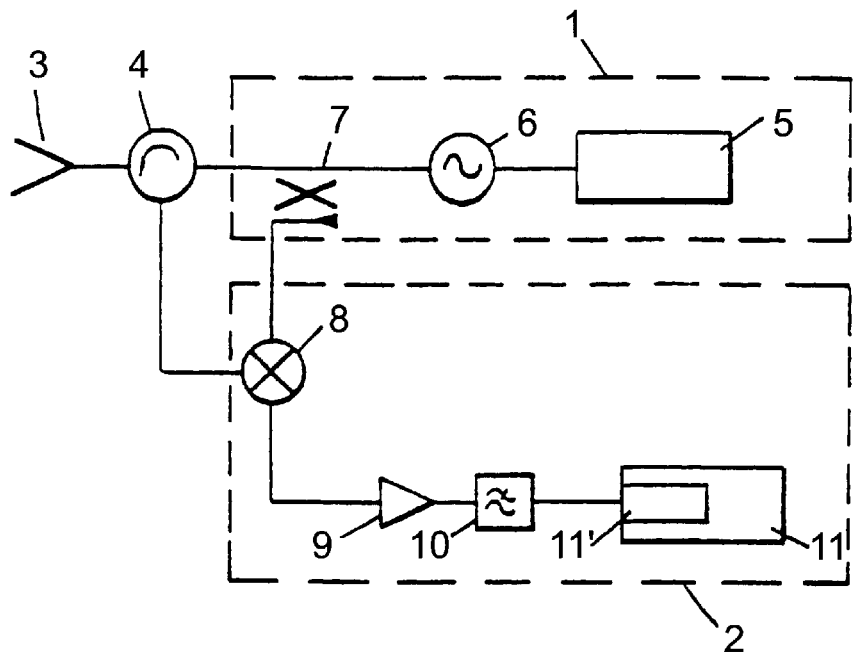
FIG. 1 shows diagrammatically the principle for how a linear FMCW radar unit works.
Figure 2:
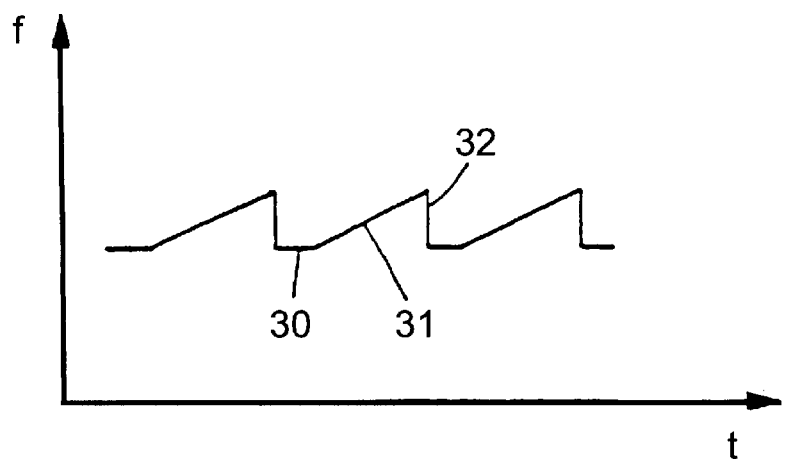
FIG. 2 shows examples of suitable frequency sweeps in a time-frequency diagram.

The radar unit shown in FIG. 1 includes a transmitter 1 and a receiver 2. An aerial 3 is connected to the transmitter and the receiver via a circulator 4. In the transmitter there is an oscillator control device 5 connected to an oscillator 6 with variable frequency. The frequency sweep from the oscillator control device 5 controls the oscillator 6 so that a signal is generated with periodically varying frequency, which signal is transmitted by the aerial 3 via a direction coupler 7 and the circulator 4. The period of a frequency sweep, see FIG. 2, has principally three parts in the form of a constant base frequency 30, a linear frequency sweep 31 and a quick return 32 to the base frequency. The oscillator 6 can work within the Gigahertz range, e.g. 77 GHz. The reflected signal received by aerial 3 is taken via the circulator to a mixer 8, where the reflected signal is combined with the transmitted signal. After amplification in the amplifier 9 and filtering in the filter 10 a difference signal or beat signal is obtained that is used as the basis for the subsequent signal processing for detecting and eliminating interference and synthesis of the useable signal without interference in a processor block 11 that can also contain what is known as an FFT processor 11'.

Figure 3:
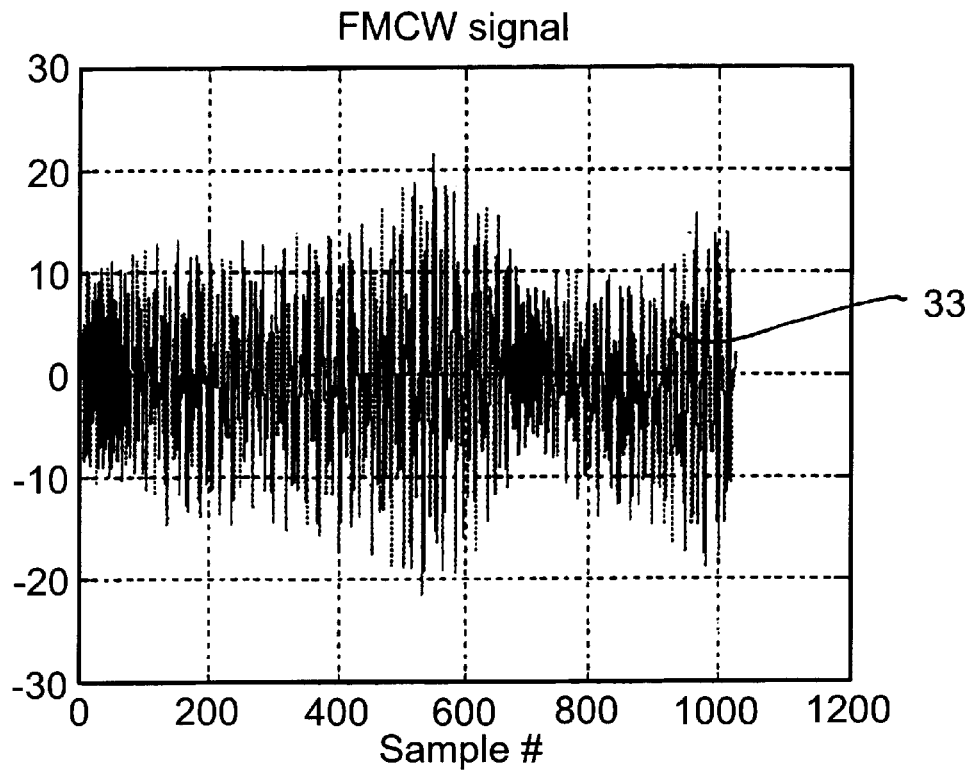
FIG. 3 shows an example of an actual sampled beat signal from an FMCW radar unit.
Figure 4:
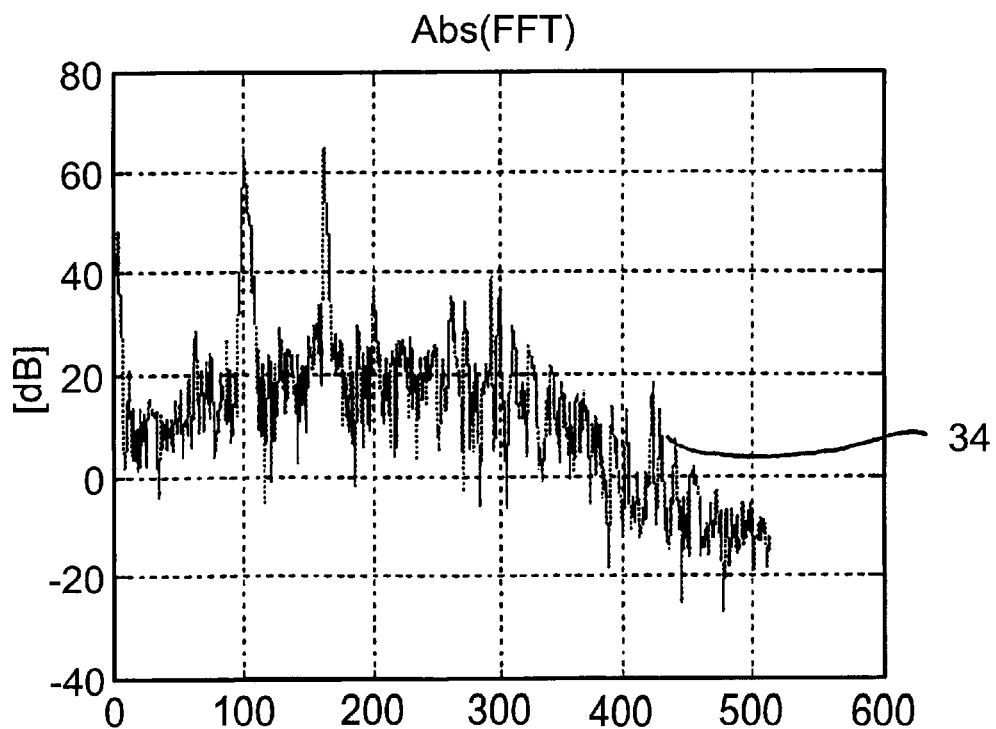
FIG. 4 shows the absolute amount of the FFT for the beat signal in FIG. 3.
Figure 5:
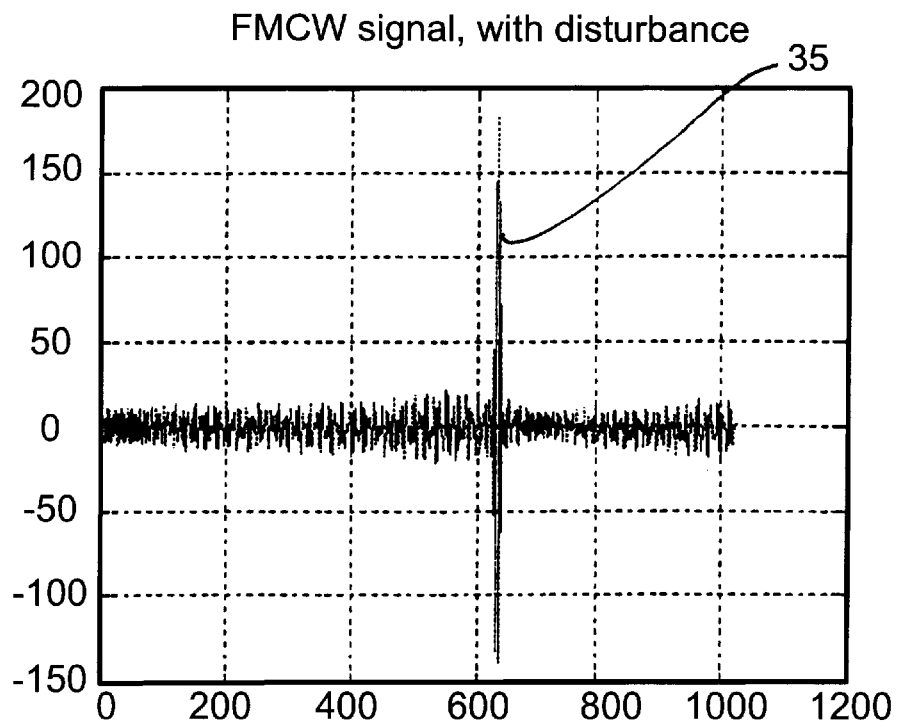
FIG. 5 shows the beat signal in FIG. 3 with an added interference of short duration.
Figure 6:
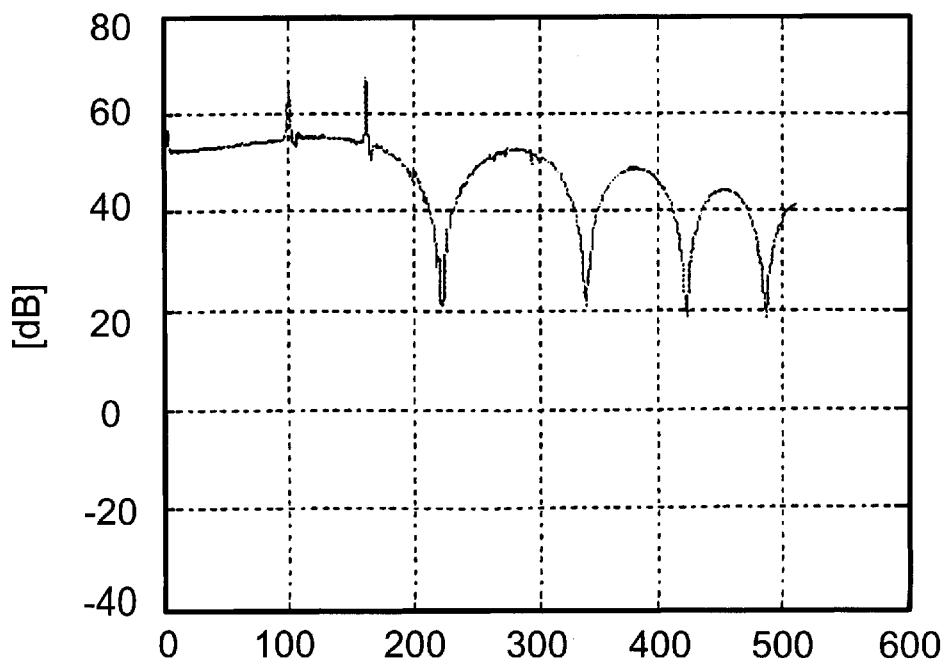
FIG. 6 shows the absolute amount of the FFT for the beat signal with interference in FIG. 5.

FIG. 3 shows an actual FMCW beat signal 33. FIG. 4 shows the absolute value of the corresponding FFT 34 utilizing Hamming windows. In FIG. 5 an interference of short duration in the form of a pulse 35 has been added to the beat signal 33 in FIG. 3. FIG. 6 shows the absolute amount for the signal with interference in FIG. 5. By comparison between the FFT without interference in FIG. 4 and the FFT with interference in FIG. 6 it appears that nearly all the information is submerged in the FFT with interference.

In the following we discuss in greater detail the principles for filtering the useable signal.

The useable signal in an FMCW radar unit, i.e. the signal that corresponds to the actual target, is a sum of sine waves. A signal consisting of a single sine wave, sampled with constant frequency, has a simple linear relationship between the samples. Assume that the signal can be written as $\sin(\omega^* t + \phi)$.

Between two samples the phase angle of the sine wave thus changes by the angle $\omega T = \theta$, where T is the sampling interval. In accordance with the trigonometric identity $$\sin(\alpha+\theta)+\sin(\alpha-\theta)=2^*\cos(\theta)^*\sin(\alpha)$$

it is then the case for three successive samples of the signal that:

$$x(n+1)+x(n-1)=2^*\cos(\theta)^*x(n)$$

Note that this is applicable regardless of the amplitude of the signal. This linear relationship can be interpreted in various ways:

a) If the signal is passed through an FIR filter (Finite Impulse Response) with the coefficients $[1-2^*\cos(\theta)1]$, the output signal y from the filter will be identical to 0:

$$y(n)=x(n)-2^*\cos(\theta)^*x(n-1)+x(n-2)$$

It is possible therefore to strongly attenuate the signal with a single FIR filter with constant coefficients.

b) If the relationship is instead written:

$$x(n+1)=2^*\cos(\theta)^*x(n)-x(n-1)$$

it can be seen that the next sample can be predicted by a linear combination from the immediately preceding sample. If the relationship is instead written:

$$x(n-1)=2^*\cos(\theta)^*x(n)-x(n+1)$$

it can be seen that a sample can be reconstructed by prediction backwards in time, i.e. from the immediately following sample.

For a signal that consists of several sine waves with distinct frequencies corresponding filters can be created by multiplication of second order FIR filters. A signal that is the sum of four different sine waves, i.e. an FMCW signal with four strong targets, can thus be reduced to zero by an FIR filter of order 8 and a sample can be predicted linearly from the 8 preceding or 8 subsequent samples.

For a general FMCW signal these relationships are approximate, but the following can be said in general to apply:

1. It is possible to strongly attenuate an FMCW signal by means of a suitable linear FIR filter of a suitable order.
2. It is possible to predict linearly an FMCW signal using a suitable linear relationship of a suitable order.

The application of point 1 is that the sensitivity of the detection of an interference is greatly increased if the useable signal is pre-filtered in a suitable way. This permits the detection of interference with an amplitude that is much lower than that of the useable signal, but which could still mask details (weak targets) in the FFT.

Point 2 makes it possible to interpolate the useable signal past a short section of interference, which will be described in greater detail later on.

A "suitable" filter can be calculated in various ways, or calculated as an adaptive filter. Both problems according to point 1 and point 2 above are known from adaptive signal treatment, see for example Haykin, Adaptive Filter Theory, 3rd Ed., Prentice-Hall 1996. The coefficients can be determined by the usual algorithms, e.g. LMS, standardized LMS, RLS, etc, see in particular chapters 9 and 13 in the above reference.

By adaptive determination of a filter it is often possible to utilize the fact that the radar aerial has turned, although only a fraction of a beam width, since the previous FMCW frequency sweep. The dominant sine waves in the signals from two subsequent FMCW sweeps have as a result almost the same frequency and almost the same amplitude. Information from the previous FMCW sweeps can therefore be used when the filter is determined.

In the following the synthesizing of the useable signal is discussed.

A very useful method of eliminating interference is to follow up the interference elimination by a synthesis of the useable signal. Here point 2 above can be used. The synthesis can consist of a one-ended extrapolation or an extrapolation from two directions (two-ended extrapolation or interpolation) of the signal based on values without interference. Such a synthesis can result in a great improvement in the reconstruction of the complex FFT for the FMCW signal without interference. By recursive application of one-stage extrapolation, the signal without interference can be reconstructed by more than one stage. The procedure is, however, mainly applicable for interferences that are short in duration (a few tens of stages).

Figure 7:
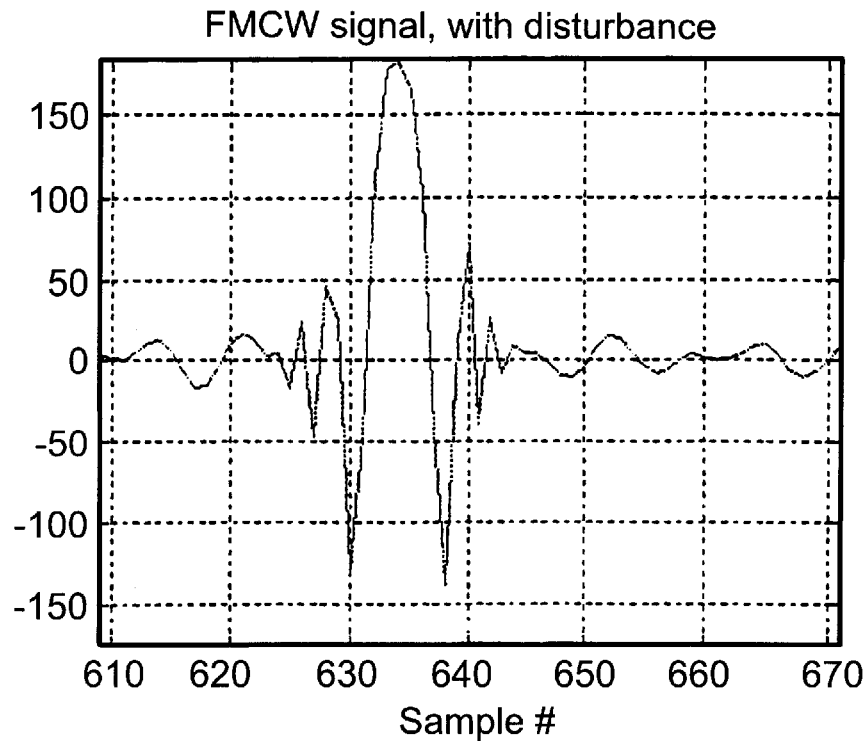
FIG. 7 shows the beat signal with interference in FIG. 5 enlarged over the area with interference.
Figure 8:
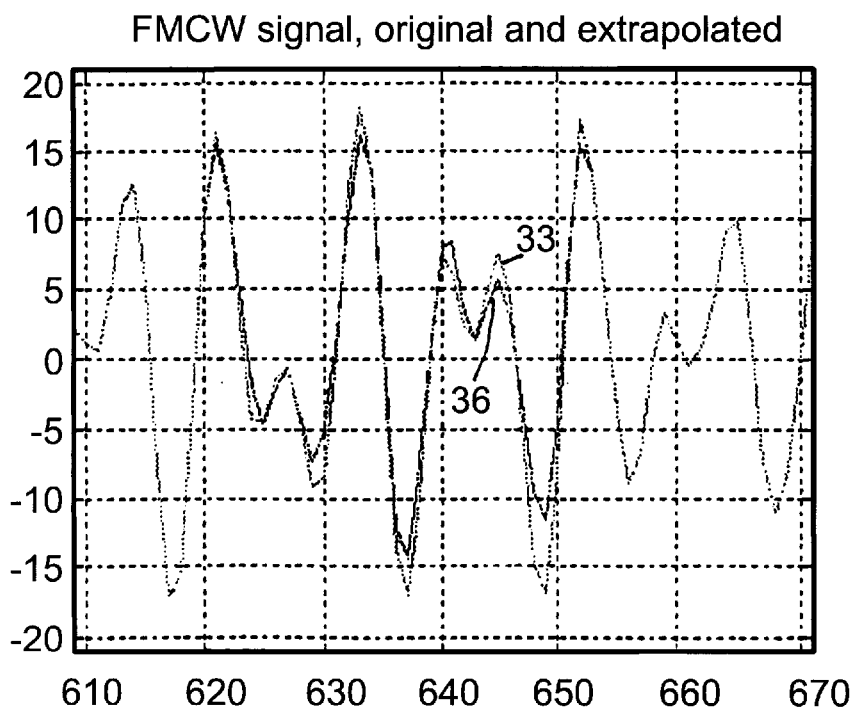
FIG. 8 shows the beat signal without interference in FIG. 3 and an extrapolated beat signal enlarged over the same area with interference as in FIG. 7.
Figure 9:
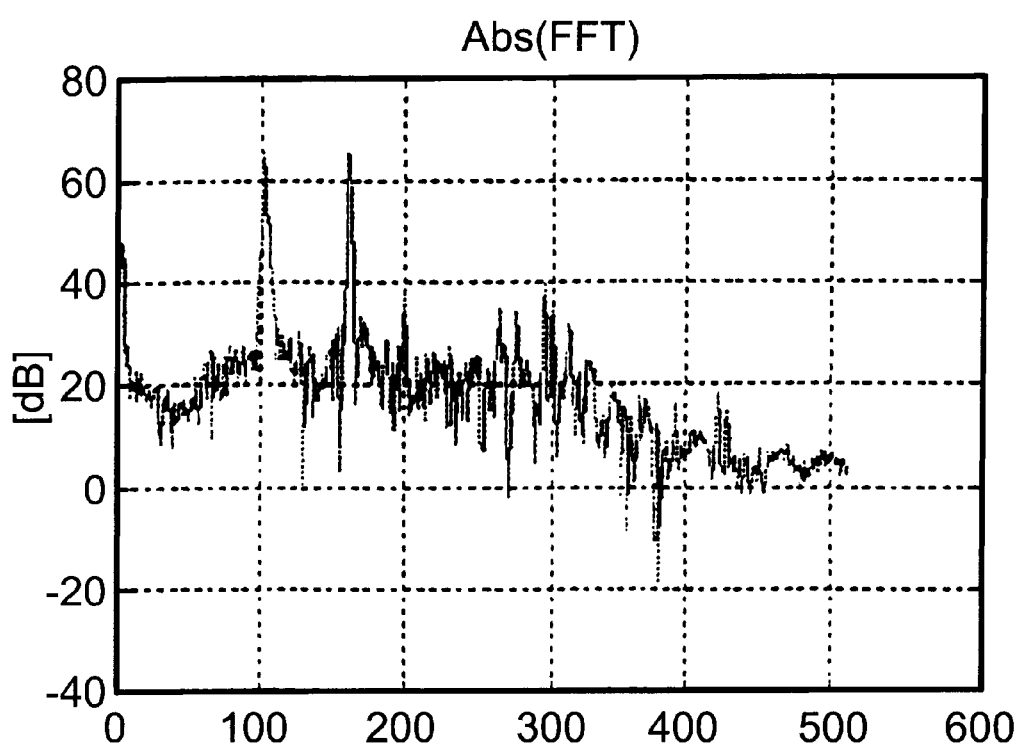
FIG. 9 shows the absolute amount of the beat signal without interference in FIG. 5 reconstructed by extrapolation as in FIG. 8.

The interference elimination is illustrated in greater detail by the signal diagrams in FIGS. 7–9. FIG. 7 shows an enlargement of the section of the beat signal with interference, with the center of concentration of the interference being localized around sample 634. FIG. 8 shows the beat signal without interference [33] together with a signal [36] that has been extrapolated over the section with interference (samples 620–654) by a linear recursion formula of the same type as described earlier. FIG. 8 shows that the extrapolation follows the correct signal form very closely across several maximums and minimums in the signal, even though the signal does not have a simple form. FIG. 9 shows the absolute amount of the FFT for this reconstructed signal [36]. A comparison between FIG. 4 and FIG. 9 shows that the absolute amount for the FFT has been reconstructed with great precision.

I claim:

1. A procedure for the elimination of interferences of short duration in a radar unit of the FMCW type with linear frequency sweep, where the transmitted and received signals are combined to form a useable signal in the form of a difference signal, the beat signal, with a wave for each target, where the frequency, amplitude and phase of the wave contain the information about the target and where the beat signal is sampled, said procedure including detecting and eliminating interferences in the beat signal in the time domain and reconstructing the part of the beat signal with interference by extrapolation based on samples without interference.

2. A procedure according to claim 1, the part of the beat signal with interference is reconstructed by extrapolation in both directions based on both previous and subsequent samples without interference.

3. A procedure according to claim 1, wherein the part of the beat signal with interference being extrapolated as linear combinations of samples without interference.

4. A procedure according to claim 3, wherein FIR filters are used for the linear combinations.

5. A procedure according to claim 3, wherein the coefficients in the linear combinations are determined by means of adaptive methods.

6. A procedure according to claim 1, wherein the information from preceding FMCW sweeps is utilized for the extrapolation.

7. A procedure according to claim 1, wherein the beat signal is pre-filtered.

8. A procedure according to claim 7, wherein information from preceding FMCW sweeps is utilized for the pre-filtering of the beat signal.

* * * * *